United States Patent
Curatolo et al.

(10) Patent No.: US 6,889,135 B2
(45) Date of Patent: *May 3, 2005

(54) SECURITY AND TRACKING SYSTEM

(75) Inventors: Benedict S. Curatolo, Valley View, OH (US); Thomas E. Cornelius, Westfield, IN (US)

(73) Assignee: C2 Global Technologies, Inc., Valley View, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/348,481

(22) Filed: Jan. 20, 2003

(65) Prior Publication Data

US 2003/0182055 A1 Sep. 25, 2003

Related U.S. Application Data

(63) Continuation-in-part of application No. 09/538,193, filed on Mar. 30, 2000, now Pat. No. 6,510,380.
(60) Provisional application No. 60/127,028, filed on Mar. 31, 1999.

(51) Int. Cl.$^7$ ............................................... G01C 21/00
(52) U.S. Cl. ..................... 701/207; 701/300; 701/200; 342/357.09; 340/572.1; 340/989
(58) Field of Search .................................. 701/207, 300, 701/200; 342/357.09, 357.07, 357.01, 457, 196; 840/572.1, 572.8, 573.1, 988, 989, 990; 343/313, 846; 455/511, 422, 419; 174/35 R; 29/856; 717/300

(56) References Cited

U.S. PATENT DOCUMENTS

| | | | |
|---|---|---|---|
| 4,694,284 A | 9/1987 | Leveille et al. | 340/573 |
| 4,744,083 A | 5/1988 | O'Neill et al. | 371/22 |
| 4,799,062 A | 1/1989 | Sanderford, Jr. et al. | 342/457 |
| 4,818,998 A | 4/1989 | Apsell et al. | 342/457 |
| 4,819,860 A | 4/1989 | Hargrove et al. | 340/573 |
| 4,839,656 A | 6/1989 | O'Neill et al. | 342/357 |
| 4,885,571 A | 12/1989 | Pauley et al. | 340/573 |
| 4,918,432 A | 4/1990 | Pauley et al. | 340/573 |
| 4,952,913 A | 8/1990 | Pauley et al. | 340/573 |
| 4,965,586 A | 10/1990 | O'Neill et al. | 342/357 |
| 5,021,794 A | 6/1991 | Lawrence | 342/457 |
| 5,027,314 A | 6/1991 | Linwood et al. | 340/573 |
| 5,189,395 A | 2/1993 | Mitchell | 340/573 |

(Continued)

OTHER PUBLICATIONS

Wherify Wireless Inc. Press Release, http://www.wherify-wireless.com/new/pressrelease/7.24.2002.htm.
Wherify Wireless Inc. Internet Web Page http://www.wherifywireless.com/prod_watches.htm.
Wherify Wireless Inc. Internet Web Page http://www.wherifywireless.com/faq.asp.

*Primary Examiner*—Thomas C. Bijon
*Assistant Examiner*—Ronnie Mancho
(74) *Attorney, Agent, or Firm*—Renner, Kenner, Greive, Bobak, Taylor & Weber

(57) ABSTRACT

A security and tracking apparatus includes at least a first signaling unit and a second signaling unit in communicating proximity with the first signaling unit, each signaling unit having a receiver for identifying the location of the signaling unit; and, a transmitter for transmitting the location of the signaling unit when the first and second signaling units are separated by more than a preselected distance. A method to locate a person, animal, or object, includes providing in contact with or at least in close proximity to the person, the animal, or the object, at least a first signaling unit and a second signaling unit, the second signaling unit in communicating proximity with said first signaling unit, each signaling unit having a receiver for identifying the location of the signaling unit and a transmitter for transmitting the location of the signaling unit when the first and second signaling units are separated more than a preselected distance; and activating the signaling units to transmit the location of the signaling units.

70 Claims, 2 Drawing Sheets

U.S. PATENT DOCUMENTS

| | | | |
|---|---|---|---|
| 5,196,825 A | 3/1993 | Young | 340/573 |
| 5,204,670 A | 4/1993 | Stinton | 340/573 |
| 5,218,344 A | 6/1993 | Ricketts | 340/573 |
| 5,223,844 A * | 6/1993 | Mansell et al. | 342/357.07 |
| 5,225,809 A | 7/1993 | Bunn | 340/574 |
| 5,225,842 A | 7/1993 | Brown et al. | 342/357 |
| 5,255,306 A | 10/1993 | Melton et al. | 340/573 |
| 5,266,944 A | 11/1993 | Carroll et al. | 340/573 |
| 5,334,974 A | 8/1994 | Simms et al. | 340/990 |
| 5,337,041 A | 8/1994 | Friedman | 340/573 |
| 5,357,254 A | 10/1994 | Kah, Jr. | 340/573 |
| 5,396,227 A | 3/1995 | Carroll et al. | 340/573 |
| 5,408,238 A | 4/1995 | Smith | 342/357 |
| 5,461,365 A | 10/1995 | Schlager et al. | 340/573 |
| 5,461,390 A | 10/1995 | Hoshen | 340/573 |
| 5,479,482 A | 12/1995 | Grimes | 455/556 |
| 5,485,163 A | 1/1996 | Singer et al. | 342/457 |
| 5,512,879 A | 4/1996 | Stokes | 340/573 |
| 5,515,419 A | 5/1996 | Sheffer | 340/539 |
| 5,525,967 A | 6/1996 | Azizi et al. | 340/573 |
| 5,559,520 A | 9/1996 | Barzegar et al. | 342/357 |
| 5,589,818 A | 12/1996 | Queen | 340/573 |
| 5,597,335 A | 1/1997 | Woodland | 441/36 |
| 5,621,388 A | 4/1997 | Sherburne et al. | 340/573 |
| 5,629,678 A | 5/1997 | Gargano et al. | 340/573 |
| 5,640,146 A | 6/1997 | Campana, Jr. | 340/573 |
| 5,640,147 A | 6/1997 | Chek et al. | 340/573 |
| 5,650,769 A | 7/1997 | Campana, Jr. | 340/573 |
| 5,650,770 A | 7/1997 | Schlager et al. | 340/573 |
| 5,686,892 A | 11/1997 | Smith | 340/572 |
| 5,708,421 A | 1/1998 | Boyd | 340/573 |
| 5,724,025 A | 3/1998 | Tavori | 340/573 |
| 5,731,785 A | 3/1998 | Lemelson et al. | 342/357 |
| 5,742,233 A | 4/1998 | Hoffman et al. | 340/573 |
| 5,781,150 A | 7/1998 | Norris | 342/357 |
| 5,793,813 A | 8/1998 | Cleave | 342/352 |
| 5,857,433 A | 1/1999 | Files et al. | 119/720 |
| 5,868,100 A | 2/1999 | Marsh | 119/421 |
| 5,905,461 A | 5/1999 | Neher | 342/357 |
| 5,926,467 A | 7/1999 | Hershey et al. | 370/319 |
| 5,982,325 A | 11/1999 | Thornton et al. | 342/357.07 |
| 6,008,727 A * | 12/1999 | Want et al. | 340/572.1 |
| 6,014,080 A | 1/2000 | Layson, Jr. | 340/573.1 |
| 6,067,045 A * | 5/2000 | Castelloe et al. | 342/357.09 |
| 6,100,806 A | 8/2000 | Gaukel | 340/573.4 |
| 6,113,539 A * | 9/2000 | Ridenour | 600/300 |
| 6,144,859 A * | 11/2000 | LaDue | 455/511 |
| 6,172,640 B1 | 1/2001 | Durst et al. | 342/357.07 |
| 6,184,801 B1 * | 2/2001 | Janky | 340/988 |
| 6,236,358 B1 | 5/2001 | Durst et al. | 342/357.09 |
| 6,236,836 B1 | 5/2001 | Westman et al. | 340/991 |
| 6,243,039 B1 | 6/2001 | Elliot | |
| 6,259,399 B1 * | 7/2001 | Krasner | 342/357.06 |
| 6,292,747 B1 | 9/2001 | Amro et al. | |
| 6,317,049 B1 | 11/2001 | Toubia et al. | 340/539 |
| 6,362,778 B2 | 3/2002 | Neher | 342/357.07 |
| 6,388,612 B1 | 5/2002 | Neher | 342/357.07 |
| 6,405,213 B1 | 6/2002 | Layson et al. | 707/104 |
| 6,421,001 B1 | 7/2002 | Durst et al. | 342/357.07 |
| 6,421,608 B1 | 7/2002 | Motoyama et al. | |
| 6,430,496 B1 | 8/2002 | Smith et al. | 701/117 |
| 6,509,867 B1 | 1/2003 | McGibney | |
| 6,510,380 B1 * | 1/2003 | Curatolo et al. | 701/207 |
| 6,593,851 B1 | 7/2003 | Bornstein | |
| 6,606,556 B2 * | 8/2003 | Curatolo et al. | 701/207 |
| 6,718,101 B2 | 4/2004 | Le Noane et al. | |
| 2001/0048364 A1 | 12/2001 | Kalthoff et al. | 340/573.1 |
| 2002/0030596 A1 | 3/2002 | Finn et al. | 340/572.1 |

* cited by examiner

SECURITY AND TRACKING SYSTEM

CROSS REFERENCE TO RELATED APPLICATIONS

The present application is a continuation-in-part of application U.S. Ser. No. 09/538,193, filed Mar. 30, 2000, (U.S. Pat. No. 6,510,380), which claims priority under 35 USC 119(e) from provisional patent application 60/127,028, filed Mar. 31, 1999.

BACKGROUND

There is a recognized need for improved personal security and emergency response capability. In situations where an individual is injured, lost, or abducted, immediate notification of an emergency situation to a local law enforcement or emergency response organization is required to maintain the safety of the individual and to avoid tragic circumstances.

Today's technology provides automatic identification of caller locations in emergency situations via wire line telephone companies. With this technology, a caller dials a 911 telephone number, and a computer accesses the caller's number in a street directory. This technology currently falls short in the case of wireless communications and in situations where there is no phone available. The importance of emergency response is demonstrated by the FCC mandate, in two phases, of Wireless 911 for the identification of a relevant public safety answering point. This mandate still falls short of necessary safety requirements in situations of abduction or kidnapping, physical or mental incapacitation, and other emergency situations remote from available wireless communications. These situations require a security and tracking apparatus that is not limited in range and is able to automatically identify the location of an individual in an emergency situation.

The prior art describes a variety of alarms and tracking systems, all of which suffer from at least two fundamental deficiencies. These systems are exemplified by U.S. Pat. No. 5,731,785, which describes a single signaling unit carried by an individual, object, or vehicle. If the signaling unit is separated from the individual, object, or vehicle, tracking is no longer possible and the system fails. Moreover, these systems fail to address the circumstances of individuals who are helpless in an emergency situation such as abduction or kidnapping, or physical or mental incapacitation.

SUMMARY

There is provided, without geographic constraints, a security and tracking apparatus with overt and covert signaling units in communicating proximity on a person, an animal, or a material asset, with a fully automated system to rapidly and reliably indicate location on demand and in certain embodiments, automatically upon removal of one signaling unit.

A security and tracking apparatus is provided, comprising a first signaling unit having means for identifying the location of said signaling unit, and a second signaling unit in communicating proximity with the first signaling unit, the second signaling unit having means for identifying the location of said second signaling unit.

In one embodiment, a security and tracking system is provided comprising a first signaling unit having means for identifying the location of said signaling unit, a second signaling unit in communicating proximity with the first signaling unit, the second signaling unit having means for identifying the location of said second signaling unit, and a monitoring station capable of receiving information identifying the location of the signaling units.

In another embodiment, a method is provided to locate a person, animal, or object, comprising providing in contact with the person, animal, or object, at least two signaling units in communicating proximity, each said signaling unit having means for identifying the location of said signaling unit, and activating said means to identify the location.

In certain embodiments a security and tracking apparatus is provided comprising at least a first signaling unit and a second signaling unit in communicating proximity with the first signaling unit, each said signaling unit having a receiver for identifying the location of said signaling unit; and, a transmitter for transmitting the location of said signaling unit when the first and second signaling units are separated by more than a preselected distance.

In certain embodiments, a security and tracking system is provided comprising
  at least a first signaling unit and a second signaling unit in communicating proximity with the first signaling unit, each said signaling unit having a receiver for identifying the location of said signaling unit; and, a transmitter for transmitting the location of said signaling unit when the first and second signaling units are separated by more than a preselected distance; and
  a monitoring station capable of receiving information identifying the location of said signaling units.

In certain embodiments, a method to locate a person, an animal, or an object, is provided comprising:
  (a) providing in contact with or at least in close proximity to the person, the animal, or the object, at least a first signaling unit and a second signaling unit, said second signaling unit in communicating proximity with said first signaling unit, each said signaling unit having a receiver for identifying the location of said signaling unit and a transmitter for transmitting the location of said signaling unit when the first and second signaling units are separated more than a preselected distance; and
  (b) activating the signaling units to transmit the location of the signaling units.

In certain embodiments, a method of locating a person, an animal or an object is provided comprising:
  a) providing an apparatus adapted to be in contact or at least in close proximity to the person, the animal or the object, the apparatus comprising at least a first signaling unit and a second signaling unit in communicating proximity with the first signaling unit, each said signaling unit having a receiver for identifying the location of said signaling unit; and, a transmitter for transmitting the location of said signaling unit when the first and second signaling units are separated by more than a preselected distance;
  b) communicating between each signaling unit to determine whether said signaling units are separated by more than the preselected distance; and
  c) upon determining that said signaling units are separated by more than the preselected distance, transmitting the location of the signaling units to a monitoring station, optionally activating said signaling unit that may be in a passive mode to transmit its location to the monitoring station.

In certain embodiments, a method of locating a person, an animal or an object is provided comprising:
  a) providing an apparatus adapted to be in contact or at least in close proximity to the person, the animal or the object, the apparatus comprising at least a first signaling unit and a second signaling unit in proximity with the first signaling unit, each said signaling unit having a receiver for identifying the location of said signaling unit; and, a transmitter for transmitting the location of said signaling unit;

b) transmitting the location of each of the signaling units to a monitoring station;

c) calculating whether said signaling units are separated by more than a preselected distance; and d) upon calculating that said signaling units are separated by more than the preselected distance, initiating at least frequent or continuous transmission of location from each signaling unit, optionally activating said signaling unit that may be in a passive mode to transmit its location to the monitoring station.

In certain embodiments, a security and tracking apparatus for a person, an animal or an object is provided comprising at least a first signaling unit and a second signaling unit adapted to be hidden in contact or in contacting proximity to the person, the animal or the object, the second signaling unit in communicating proximity with the first signaling unit, each said signaling unit having a GPS receiver for identifying the location of said signaling unit; and, a cellular transceiver for transmitting the location of said signaling unit when the first and second signaling units are separated by more than a preselected distance.

In various embodiments, each said signaling unit is adapted to activate its cellular transceiver to transmit the location of said signaling unit to a monitoring station under at least one of the following conditions:

a) automatically when the first and second signaling units are separated by more than a preselected distance, b) upon demand from the monitoring station, c) upon demand from the person, d) upon loss or absence of communication from the other signaling unit, or e) upon preselected intervals;

wherein the monitoring station optionally comprises a cellular phone, a PDA or Pocket PC™, a computer, or a combination thereof.

In one embodiment, at least one signaling unit additionally comprises a monitoring station adapted to generate a signal to notify the person of the other signaling unit being separated by more than a preselected distance.

DETAILED DESCRIPTION

This invention is directed to a security and tracking system and apparatus, and a method used to identify the location of an individual such as in an emergency situation, the location of a missing animal, or the location of a missing material asset.

Figure 1:
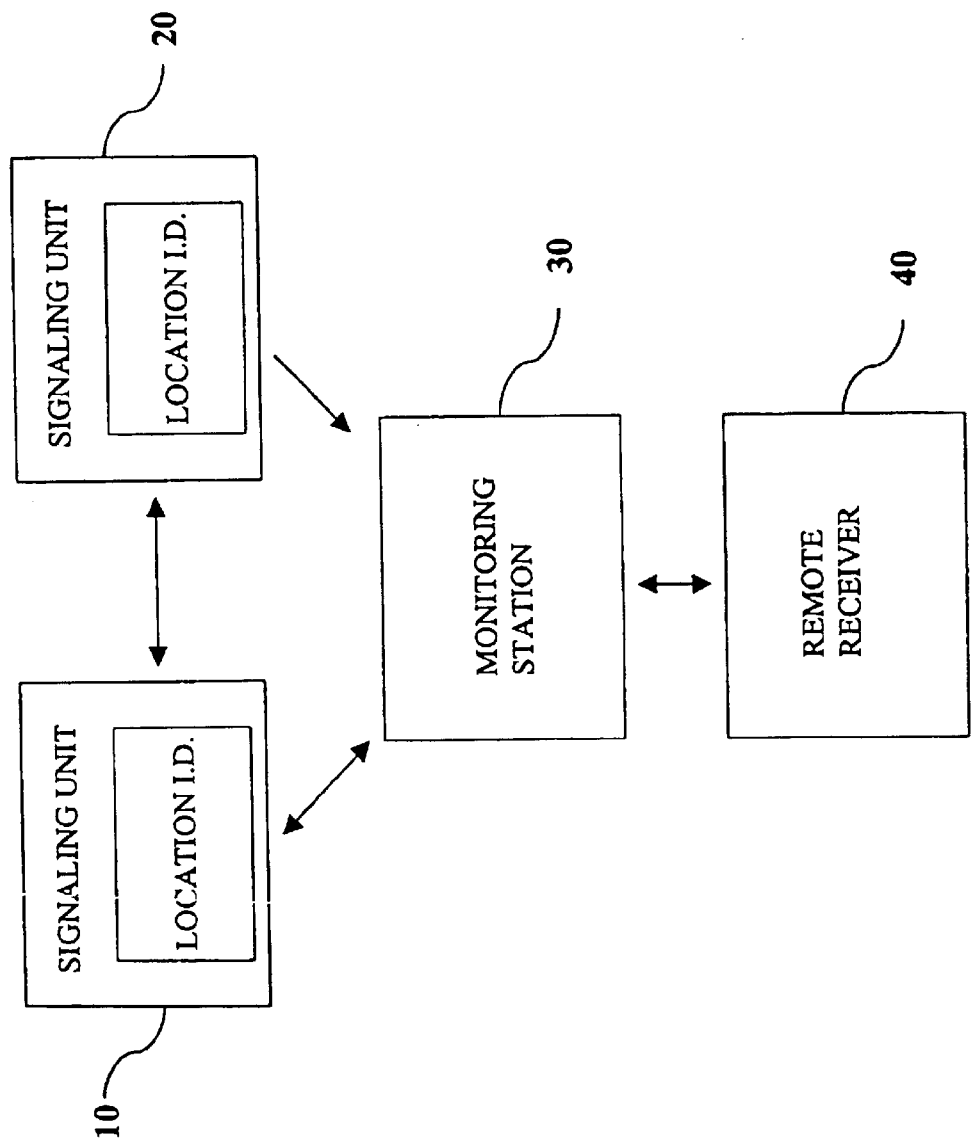
FIG. 1 is a schematic of a security and tracking system in accordance with certain embodiments.
Figure 2:
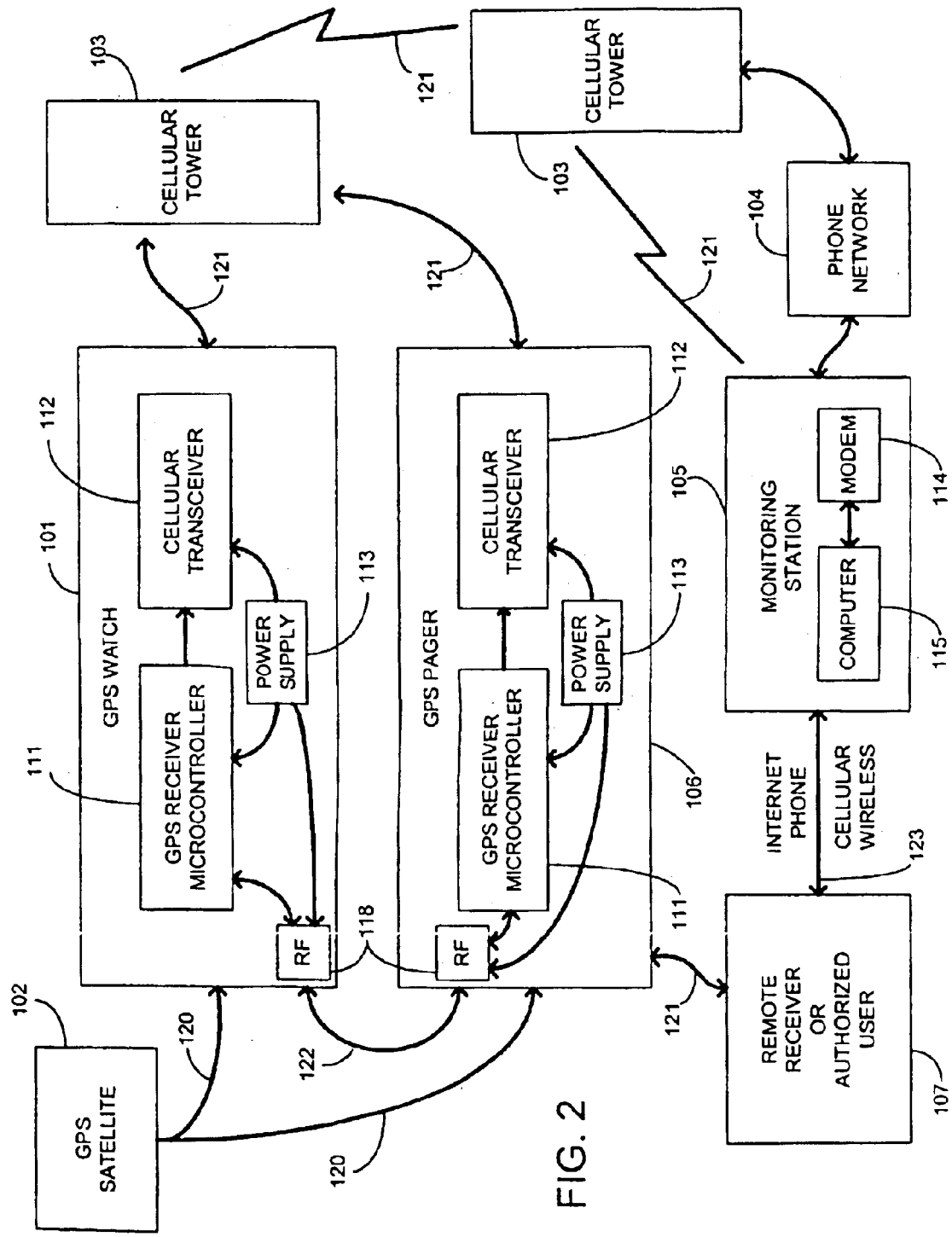
FIG. 2 is a schematic representation of a security and tracking system in accordance with certain embodiments.

Referring to FIG. 1, a security and tracking system is provided comprising a first signaling unit 10 having means for identifying the location of said signaling unit; and a second signaling unit 20 in communicating proximity with the first signaling unit, said second signaling unit having means for identifying the location of said second signaling unit.

In one embodiment, the security and tracking system includes means for transmitting the location of each signaling unit automatically when the signaling units are separated more than a preselected distance. To provide the greatest possible degree of security, it is desirable for the system to signal immediately and automatically in the case of an emergency situation. Examples of such situations include the removal of one of the associated signaling units from an individual in a kidnapping or abduction situation, theft of a material asset containing a signaling unit, and the like.

In another embodiment, the security and tracking system includes means for receiving an initiating signal for activating the transmission of information identifying the location of the signaling units. This initiating signal may originate from a monitoring station 30 or other remote location. The security and tracking apparatus, therefore, allows a parent or guardian to determine the location of an individual in their care if they discover that the individual is missing or may be in an emergency situation. Likewise, the owner of a pet or material asset may determine the location of the animal or material asset in the case of theft or loss. The transmission of information identifying the location of the signaling units may also be initiated by one of the signaling units, which is vital in a medical emergency or abduction situation, or by an independent signaling unit.

The signaling units have numerous capabilities and options, including capabilities for analog or digital signal processing, transmitting, and receiving. Components of the signaling units may include, but are not limited to, a power source, an antenna, a receiver, a transmitter, a microprocessor, an electronic switch, a sensor, a signal generator, a timer circuit, and an optional microphone and video camera. The preferred power source is a battery, but power may also be supplied by other means, for example, by mechanical motion or a battery charger. The signaling units may contain a global positioning satellite (GPS) system antenna, and may also contain additional types of antennas, for example, a cellular telephone antenna, radio antenna, etc., depending on how information and data is desired to be exchanged with the Global Positioning System, the monitoring station, etc.

The signaling units may receive information via a GPS receiver processor, cellular telephone receiver, radio receiver, and the like. A microprocessor may be used to match and verify a code that uniquely identifies each signaling unit. Electronic switches, sensors, and timing circuits may be used for manual signals or to determine emergency situations for signaling, such as the absence of a periodic signal from a first signaling unit to a second signaling unit. The periodic signal may utilize radio waves, infrared technology, ultrasonic technology, mobile document application language (Modal) technology, software at the monitoring station, or any other known means. A manual switch is preferably configured to prevent accidental activation, for example, an internal switch or button that may be activated after opening a signaling unit, but which cannot be activated by accidental bumping. Signal generators may be any type of transmitter that can send a periodic signal to another signaling unit or an emergency signal to a monitoring station.

In one embodiment, the means for identifying the location of the signaling units utilizes at least one of the group consisting of the global positioning satellite (GPS) system, low earth orbit satellites, geostationary satellites, other types of satellites, and a cellular network. Examples of low earth orbit satellites include, but are not limited to, the type specified for Motorola's Iridium system. Cellular networks continue to proliferate and the coverage of such networks also continues to increase, but some locations remain out of range of existing cellular networks. Complete coverage of all possible locations is desired, with use of more than one system preferred for purposes of redundancy and reliability. It is preferred for the means for identifying the geographical location of the signaling units to utilize the global positioning satellite (GPS) system.

The global positioning satellite (GPS) system is a space-based positioning, velocity, and time system that has three major segments: (1) space, (2) control, and (3) user. The GPS space segment is composed of 24 satellites in six orbital planes. The satellites operate in circular 20,200 km orbits at an inclination angle of 55 degrees with a 12-hour period. The spacing of satellites in orbit is arranged so that a minimum of five satellites are in view to users worldwide. Each satellite transmits on two band frequencies, 1575.42 MHz and 1227.6 MHz. The GPS control segment has five monitor stations which use a GPS receiver to passively track all satellites in view and thus accumulate ranging data from the satellite signals. The information from the monitor stations is processed at a master control station to determine satellite orbits and to update the navigation message of each satellite. This updated information is transmitted to the satellites via ground antennas, which are also used for transmitting and receiving satellite control information. The GPS user segment consists of antennas and receiver processors that provide positioning, velocity, and precise timing to users.

The GPS concept is predicated upon accurate and continuous knowledge of the spatial position of each satellite in the system with respect to time and distance from a transmitting satellite to the user. Each satellite transmits unique data which is periodically updated by a master control station based upon information obtained from five widely dispersed monitor stations. Each satellite continuously transmits a composite spread spectrum signal at 1227.6 and 1575.42 MHz. The GPS receiver makes time-of-arrival measurements of the satellite signals to obtain the distance between the user and the satellites. These distance calculations, together with range rate information, are combined to yield system time and the three dimensional position and velocity of the user with respect to the satellite system. A time coordination factor then relates the satellite system to Earth coordinates. The GPS system, therefore, is a space based positioning system that provides three dimensional position, velocity and time information to suitably equipped users anywhere on or near the surface of the Earth. The GPS system provides continuous worldwide three-dimensional coverage, and system capacity is unlimited.

The GPS system provides two services for position determination, standard positioning service (SPS) and precise positioning service (PPS). Accuracy varies with the capability of the user's equipment. The standard positioning service (SPS) is the standard specified level of positioning and timing accuracy that is available without qualification or restrictions to any user on a continuous worldwide basis. The accuracy of this service is established by the U.S. Department of Defense based on U.S. security interests, and provides on a daily basis at any position worldwide, horizontal positioning accuracy within 100 meters. The precise positioning service (PPS) is the most accurate positioning, velocity, and timing information continuously available worldwide from the basic GPS system. This service is limited to authorized United States and allied federal governments, authorized foreign and military users, and eligible civil users, and provides a predictable positioning accuracy of 22 meters horizontally and time interval accuracy within 90 nanoseconds. In another embodiment, differential methods may be used to provide increased positioning accuracy.

In certain embodiments, at least one signaling unit is adapted to be hidden. A sophisticated security apparatus is thus provided, which may contain both a covert component and an overt component. An overt component in a security system may be easily noticed and either circumvented or copied, and the real security lies in a covert component, which is not easily seen, recognized, or circumvented. In one embodiment, at least one signaling unit is covert or hidden, and at least one signaling unit may be overt and not hidden. An overt unit is obvious and easily recognized, and a kidnapper or abductor would be expected to remove the unit and throw it away. In the case of prior art systems where the only signaling unit was overt, the unit itself could be tracked, but an individual separated from the unit would be lost once the unit was removed. According to the present invention, a signal may be generated immediately when the associated signaling units are separated more than a preselected distance, and all signaling units are able to be tracked. This feature is extremely important, since an individual could be taken miles away within minutes of being abducted.

In an embodiment where at least one signaling unit is adapted to be hidden, it is desirable that the signaling unit be small. A small signaling unit allows it to be hidden more easily, and also allows the unit to be incorporated into a plurality of articles. A signaling unit may be incorporated into a molded article, an extruded article, a sewn article, and the like. The incorporation of a signaling unit into an article may be effected by any known manual or automated manufacturing method. The mode of attachment of a signaling unit may also be an adhesive, and may be a pressure sensitive adhesive.

The signaling units may be incorporated into a wearable article. Examples of a wearable article include, but are not restricted to, at least one of an article of clothing, a shoe, a watch, a wristband, a bracelet, an identification card, an article of jewelry, a hair accessory, eyeglasses, and an animal collar.

In one embodiment, at least one signaling unit is securely attached to an individual. An important feature of the security and tracking apparatus is its utility for personal security for children, individuals with physical disabilities, individuals with mental disabilities, for example, Alzheimer patients, individuals in wilderness areas, and any other individuals who might encounter an emergency situation. The signaling units may be configured for secondary operations which may include, but are not limited to, receiving or transmitting video signals or audio signals, the monitoring of physiological functions in order to determine the presence of emergency situations, and the like. The security and tracking apparatus can also aid in the apprehension of individuals responsible for abduction and kidnapping and, therefore, contribute to overall public safety.

In another embodiment, at least one signaling unit is securely attached to an animal. The present invention has utility for the security and tracking of pets and may also be used with any other animal for any other purpose such as scientific study, the assurance of public safety, etc.

In another embodiment, at least one signaling unit is securely attached to a material asset or personal accessory. A signal will be generated when a material asset (that is, an object) containing a signaling unit is separated more than a preselected distance from an associated signaling unit, which may be carried by the owner of the asset or kept in the desired location of the asset. Examples of material assets or personal accessories include, but are not limited to, a credit card, a wallet, a checkbook, a purse, a cellular phone, a pager, a motor vehicle, a boat, an aircraft, a television, a radio, a stereo, a tape player, a compact disc player, a DVD player, an MP3 player, a VCR, a camera, a movie camera, a computer, a printer, a laptop or notebook computer, a PDA or PocketPC™, a briefcase, a suitcase, a backpack, a weapon, an article of clothing, an article of jewelry, and an article of artwork. Multiple signaling units may also be placed in various components of a material asset, for example in a cellular phone and stereo of a motor vehicle as well as in the motor vehicle itself, so that the individual components may be traced in the case of their separation, such as the stripping of a motor vehicle after theft. The security and tracking apparatus can also aid in the apprehension of individuals responsible for the theft of the material asset and, therefore, contribute to overall public safety. The signaling units may be configured for secondary operations that may include, but are not limited to, receiving or transmitting video signals or audio signals, the disabling of firearms that have been separated from their owners, and the disabling of motor vehicles that have been separated from their owners.

The signaling units may be in a passive mode when the signaling units are in close or communicating proximity. An active mode in the absence of an emergency situation could unnecessarily drain available power in signaling units containing batteries, so a passive mode may be used in non-emergency situations.

The information identifying the geographical location of the signaling units may be transmitted continuously. In an emergency situation, a continuous signal transmitting information identifying location is expected to be most accurate. The availability of a continuous signal may be limited by available power. The information identifying the location of the signaling units may also be transmitted intermittently. An intermittent signal at appropriately short intervals can be used to conserve power.

In one embodiment, the information identifying the location of the signaling units is provided in an encrypted form. For the ultimate in security, it may be important in certain situations to send information in encrypted form to prevent the information from being used by individuals such as thieves, kidnappers, etc. to compromise the safety of individuals, animals, or material assets that the security system is designed to protect.

In certain embodiments, a security and tracking system is provided comprising a first signaling unit 10 having means for identifying the location of said signaling unit, a second signaling unit 20 in communicating proximity with the first signaling unit, said second signaling unit having means for identifying the location of said second signaling unit, and a monitoring station 30 capable of receiving information identifying the location of said signaling units. The location of the signaling units will be transmitted to the monitoring station automatically when the signaling units are separated more than a preselected distance. In an additional embodiment, the monitoring station includes a means for transmitting information identifying the location of the signaling units from the monitoring station to a remote receiver 40. The location of the remote receiver may be the home or work address of a parent or guardian of an individual, the home or work address of the owner of a pet, the home or work address of the owner of a material asset, a missing child organization or other service organization, a newspaper publisher, a radio station, a television station, a law enforcement agency facility, a law enforcement vehicle, an emergency response vehicle, an emergency care facility, etc. In certain embodiment, the location of the remote receiver is one of a service organization, a law enforcement agency facility, a law enforcement vehicle, an emergency response vehicle, and an emergency care facility.

The means for identifying the location of the signaling units may involve the use of satellite systems such as the GPS system or low earth orbit satellites, radiolocation, cellular networks, or any other method known to those skilled in the art. The method by which the monitoring station receives information identifying the geographic location of the signaling units may involve the use of satellite systems, radio signals, television signals, telephone communications, cellular communications, internet communications, or any other communication means known to those skilled in the art. It is preferred to have systems in place to transmit information by more than one method to provide speed, accuracy, back-up, and reliability for the security system.

The means for transmitting information identifying the location of the signaling units from the monitoring station to a remote receiver may involve the use of satellite systems, radio signals, television signals, telephone communications, cellular communications, internet communications, or any other communication means known to those skilled in the art. It is preferred to have systems in place to transmit information by more than one method to provide speed, accuracy, back-up, and reliability for the security system.

In another embodiment, a method is provided to locate a person, animal, or object, comprising providing in contact with or at least in close proximity to the person, animal, or object, at least two signaling units in communicating proximity, each said signaling unit having means for identifying the location of said signaling unit, and activating said means to identify the location. By "close proximity" is meant that the units may be attached, incorporated, worn or carried.

In one embodiment, the method includes automatically activating the transmission of the location of the signaling units when the signaling units are separated more than a preselected distance. To provide the greatest possible degree of security, it is desirable for the location of the signaling units to be transmitted immediately and automatically in the case of an emergency situation. Examples of such situations include the removal of one of the associated signaling units from an individual in a kidnapping or abduction situation, theft of a material asset containing a signaling unit, and the like.

In another embodiment, the method includes initiating the transmission of information identifying the location of the signaling units upon receiving instructions from a remote source. The transmission of information identifying the location of the signaling units may be activated by one of the signaling units or by a signal from a monitoring station. In an additional embodiment, at least one signaling unit is small and is hidden in a wearable article. One method for obtaining the location of the signaling units utilizes the global positioning satellite (GPS) system.

In certain embodiments, the signaling units are operated in a passive mode when they are in close or communicating proximity. An active mode in the absence of an emergency situation could unnecessarily drain available power in signaling units containing batteries, so a passive mode may be used in non-emergency situations. The information identifying the location of the signaling units may be transmitted continuously. In an emergency situation, a continuous signal transmitting information identifying location is expected to be most accurate. The availability of a continuous signal may be limited by available power. The information identifying the location of the signaling units may also be transmitted intermittently. An intermittent signal at appropriately short intervals can be used to conserve power. The information identifying the location of the signaling units may also be provided in an encrypted form. For the ultimate in security, it may be important in certain situations to send information in encrypted form to prevent the information from being used by individuals such as thieves, kidnappers, etc. to compromise the safety of individuals, animals, or material assets that the security system is designed to protect.

In another embodiment, a method is provided to locate a person, animal, or object, comprising providing in contact with or at least in close proximity to the person, animal, or object, at least two signaling units in communicating proximity, each said signaling unit having means for identifying the location of said signaling unit, and activating said means to identify the location of the signaling units to a monitoring station. The location of the signaling units may be provided within an unlimited range.

In certain embodiments, a method is provided for the transmission of the location of the signaling units from a monitoring station to a remote receiver. The location of the remote receiver may be the home or work address of a parent or guardian of an individual, the home or work address of the owner of a pet, the home or work address of the owner of a material asset, a missing child organization or other service organization, a newspaper publisher, a radio station, a television station, a law enforcement agency facility, a law enforcement vehicle, an emergency response vehicle, an emergency care facility, etc. In a certain embodiments, the location of the remote receiver is one of a service organization, a law enforcement agency facility, a law enforcement vehicle, an emergency response vehicle, and an emergency care facility.

Additional information may also be transmitted to the remote receiver. For a security and tracking system for an individual, the additional information transmitted to the remote receiver could include, but is not limited to, the physical description of the individual, a picture of the individual, fingerprints, etc. For a security and tracking system for an animal, the additional information transmitted to the remote receiver could include, but is not limited to, the physical description of the animal, a picture of the animal, etc. For a security and tracking system for a material asset, the additional information transmitted to the remote receiver could include, but is not limited to, the physical description of the material asset, a picture of the material asset, a registration number, a serial number, etc. In the case of a motor vehicle, the description may include a picture of the vehicle and the make, model, year, color, and license plate number of the vehicle, etc.

The method for transmitting information identifying the geographical location of the signaling units from the monitoring station to a remote receiver may be accomplished using any known means of communication, which includes, but is not limited to, radio waves, a computer network such as the internet, a telephone network, a cellular network, television transmissions, and the like. In one embodiment, the information identifying the geographical location of the signaling units is transmitted from the monitoring station to a remote receiver using low earth orbit satellites or the global positioning satellite (GPS) system. In a preferred embodiment, multiple forms of communication are used to provide redundancy and back-up in the case of failure of one or more communication systems.

The monitoring station may have a continuous ability to transmit information to the remote system at any time. The monitoring station may be computer controlled with recording capability and automatic and direct communication links to identified remote receiver devices which may be in the possession of individuals such as a parent or guardian in the case of a security system for an individual, an owner in the case of a security system for an animal or material asset, or at the location of a service organization, for example, a missing child organization, and emergency and law enforcement agencies in the geographic vicinity of the signaling units. The monitoring station may optionally employ human operators, and may, as described above, transmit additional information to the remote receiver.

In one embodiment, the geographical location of the signaling units is identified with an accuracy of about 100 meters. In another embodiment, the geographical location of the signaling units is identified with an accuracy of about 22 meters, and in certain embodiments, such as using differential technologies, an accuracy of a few meters.

In certain embodiments, the signaling units are not limited in geographic range from the monitoring station. Any restriction in geographic range, as in prior art security systems, could limit the effectiveness of the security apparatus. Through the utilization of the GPS system and other systems, the security and tracking apparatus is able to perform in certain embodiments without geographic range restrictions.

The following examples illustrate security and tracking systems and apparatus in accordance with the present invention.

EXAMPLE 1

A security and tracking apparatus is assembled with two small signaling units incorporated into (1) a medical bracelet and (2) a wallet for an Alzheimer's patient. The signaling units each contain a battery power supply, a GPS antenna, a GPS receiver processor, a radio antenna, a radio receiver, and a radio transmitter. Upon a telephone request from the caregiver of the patient, a monitoring station sends a radio signal to the signaling units instructing the units to identify their geographical location. The signaling units receive the radio instructions from the monitoring station, send signals to the global positioning satellite (GPS) system, and receive return signals from the GPS identifying their geographical locations. Radio signals are then sent from the signaling units to the monitoring station identifying their geographic locations. The locations of the units are transmitted from the monitoring station to the caregiver via telephone communication.

EXAMPLE 2

A security and tracking apparatus is assembled with two small signaling units incorporated into (1) a medical bracelet and (2) a wallet for an Alzheimer's patient. The signaling units each contain a battery power supply, a GPS antenna, a GPS receiver processor, a radio antenna, a radio receiver, a radio transmitter, a cellular telephone antenna, a cellular telephone receiver, and a cellular telephone transmitter. The first signaling unit sends a periodic radio signal to the second signaling unit. Upon loss of the wallet, the two signaling units are separated more than a predetermined distance, and the periodic radio signal from the first signaling unit is no longer received by the second signaling unit. The loss of the periodic signal causes each signaling unit to automatically send a signal to the global positioning satellite (GPS) system and receive a return signal from the GPS identifying its geographical location. A cellular telephone signal is automatically sent from each signaling unit to the monitoring station identifying its geographic location. The location of each unit is transmitted by telephone communication from the monitoring station to the caregiver of the patient and to a law enforcement agency in the geographic vicinity of the two signaling units (the lost wallet and the patient wearing the medical bracelet).

EXAMPLE 3

A security and tracking system is assembled, comprising two small associated signaling units incorporated into a visible wristwatch and a hidden ankle bracelet on a child, and a monitoring station capable of sending transmissions to and receiving transmissions from the signaling units. The signaling units each contain a battery power supply, a GPS antenna, a GPS receiver processor, and an antenna, receiver, and transmitter capable of communication with low earth orbiting satellites. Upon a telephone request from the parent or guardian of the lost child, the monitoring station sends a signal to the signaling units via low earth orbiting satellites instructing the units to identify their geographical location. The signaling units receive the instructions from the monitoring station, send signals to the global positioning satellite (GPS) system and receive return signals from the GPS identifying their geographical locations, and transmit this information to the monitoring station via low earth orbiting satellites. The locations of the units are transmitted via cellular communication from the monitoring station to the parent or guardian and to a law enforcement agency in the geographic vicinity of the signaling units, and a video picture and description of the child is also transmitted to the law enforcement agency.

EXAMPLE 4

A security and tracking system is assembled, comprising two small associated signaling units incorporated into a visible wristwatch and a hidden ankle bracelet on a child, and a monitoring station capable of sending transmissions to and receiving transmissions from the signaling units. The signaling units each contain a battery power supply, a GPS antenna, a GPS receiver processor, a radio antenna, a radio receiver, a radio transmitter, a cellular telephone antenna, a cellular telephone receiver, and a cellular telephone transmitter. The first signaling unit sends a periodic radio signal to the second signaling unit. Upon abduction of the child, the abductor removes the wristwatch, the two signaling units are separated more than a predetermined distance, and the periodic radio signal from the first signaling unit is no longer received by the second signaling unit. The loss of the periodic signal causes each signaling unit to automatically send a signal to the global positioning satellite (GPS) system and receive a return signal from the GPS identifying its geographical location. A cellular telephone signal is automatically sent from each signaling unit to the monitoring station identifying its geographic location. The location of each unit is transmitted by telephone communication from the monitoring station to the parent or guardian of the child and to a law enforcement agency in the geographic vicinity of the two signaling units (the removed wristwatch and the child wearing the hidden ankle bracelet), and a video picture and description of the child is also transmitted to the law enforcement agency.

FURTHER EMBODIMENTS

The invention provides a system that provides location information for a person, an animal, or a material asset (that is, an object) when requested and/or upon the occurrence of an event or situation. The system may make use of a plurality of independent and redundant subsystems. Each subsystem signaling unit may have the ability to continue transmission of the location of the person, the animal or the object in the event of another subsystem signaling unit's malfunction or absence from the person, the animal or the object. In certain embodiments, one subsystem may be "active" at all times; "active" meaning only that the device is at that time responsible for the transmission of location data. The currently "active" subsystem may use GPS to determine its location, and cellular technology to communicate its location to a monitoring station. In one embodiment, the monitoring station receives the location of the person, the animal or the object, and communicates that information to a remote receiver, accessible to one such as a parent, guardian, animal or asset owner, or appropriate medical or safety authorities. These individuals may alternatively be the monitoring station user or operator.

In certain embodiments, the system includes a signaling unit containing a GPS chip, circuitry, and other hardware and/or software that, when requested by a monitoring station calculates and transmits its location via established protocols. The monitoring station, which may be a computer, can communicate the signaling unit's location to users of the monitoring station, or to a remote receiver such as another computer via the Internet, or to another person or device telephonically or wirelessly (including but not limited to via cellular, radio frequency, television, or satellite communication). The monitoring station and/or the remote receiver computer may be a desktop or tower unit, a laptop or notebook unit, or a handheld device. Handheld devices include, but are not limited to personal data assistant (PDA) and PocketPC™ devices.

In one embodiment, by way of example but not limitation, the system apparatus comprises one signaling unit that is of a size similar to a wristwatch that may make use of cellular technology along with GPS. A watch, such as a wristwatch, for example, may be the main "active" subsystem 101. The signaling unit may contain a watch face with a plurality of buttons for controlling watch functions. The watch functions may include keeping time, setting time, and setting alarms. A GPS receiver 111 or integrated GPS receiver microcontroller may be embedded in the watch 101. The receiver may be packaged in a ball grid array. The receiver may update from a GPS signal 120, transmitted by a GPS satellite 102, periodically such as every second, and may have a position accuracy of about 100 meters, in certain embodiments about 22 meters on average, and in other embodiments, about a few meters.

The subsystem signaling unit 101 may be capable of receiving a request for location on demand, such as a signal 121 communicated within the cellular band of frequencies using a cellular transceiver 112, as well as transmitting the signaling unit's location in the event of an emergency. The cellular transceiver 112 may use modulation techniques such as PCS, GSM, or others in the cellular band or other frequencies to transmit the individual's location data, via a cellular tower 103 and optionally the land based phone line network 104, to the monitoring station 105 or monitoring stations. The active function of the subsystem signaling unit 101 can be replaced by another (back-up) subsystem signaling unit or device 106 in the event that it becomes "inactive", determined by a loss in cellular connection 121 or inter-device communication 122. Inter-device communication may be accomplished in certain embodiments between RF transceivers 118 in each signaling unit.

The main subsystem signaling unit 101 may be powered by a rechargeable power source 113 that may be recharged through a docking unit. The docking unit optionally may provide a diagnostic station for the device. Alternatively, a replaceable power supply may be used. The power source may provide at least one day's power requirements, and in other embodiments may provide at least one week's power requirements without maintenance. The power source may be at least one rechargeable or replaceable battery, solar cell, kinetic power device, or any combination thereof.

In certain embodiments, the passive subsystem signaling unit(s), or backup signaling unit(s) 106, may be powered up only periodically to verify that the system is still intact (that is, in close proximity) with at least one subsystem signaling unit being "active". The backup signaling unit 106 also may use a GPS receiver 111 to determine its location. A backup signaling unit 106 may have the appearance of a small pager, or another conventional personal accessory, as discussed above. The subsystem signaling units may be water-resistant and weather-resistant.

In one embodiment, the locus of control is the monitoring station. In this case, the subsystem signaling units may not initiate any communication with the monitoring station unless an emergency occurs, such as a loss of the signal from a companion subsystem signaling unit or determination of separation between the signaling units of more than the preselected distance. Each of the subsystem signaling units may have an emergency contact ability; so in that event, the signaling units can communicate with the monitoring station, relaying information such as identity, time, location, and status.

The monitoring station 105 may have the ability to communicate with any subsystem signaling unit. The monitoring station may be able both to request and to receive the signaling unit's location on demand. The monitoring station 105 may comprise a computer 115 in communication with a modem 114, and may be able to communicate and/or display incoming location data in a format proper for use by a remote receiver 107, a monitoring station user, an authorized user and/or proper authorities.

In certain embodiments, the monitoring station is able to log all transactions, i.e., communications, with any subsystem signaling unit. The monitoring station may have a database, which stores all pertinent information. In one embodiment, the database may be a SQL server database. In certain embodiments, the monitoring station has a data format for emergency calls that includes pertinent information concerning the individual. In certain embodiments, the monitoring station has a means of communication with the proper authorities, directly or via a remote receiver. Such means of communication may involve wireless or cellular communication, land based phone lines, Internet, and any combinations thereof 123. In one embodiment, an authorized user, such as a parent, may access a secure Internet web site such as with an ID and password, and determine the location of the subsystem signaling unit-wearing child.

It can be appreciated that there may be more than one appropriate media and/or protocol for each communications link in the system, (radio, cellular, Bluetooth™, and the like). In certain embodiments, communications between the subsystem signaling unit(s) and the monitoring station, as well as between the subsystem signaling units, may be encrypted, such as "not plain text", according to techniques known in the art.

It can be further appreciated that a single monitoring station can communicate with multiple sets of subsystem signaling units, that is, signaling units associated with more than one individual, animal, or asset.

According to an alternative embodiment, each associated subsystem signaling unit may periodically report to the monitoring station. When the monitoring station calculates that the associated signaling units are separated by a more than a preselected distance, the monitoring station may initiate more frequent (in one embodiment, continuous) transmission of location from the signaling units and/or may notify the proper person or authorities.

In certain embodiments, the locus of control is in the subsystem signaling units. As discussed above, two signaling units may be in continual or periodic communication with each other. When separated by more than a preselected distance, both signaling units transmit their locations to the monitoring station. Alternatively, one signaling unit is active to receive and transmit information both with the second signaling unit and with the monitoring station. The second signaling unit is passive and is powered only to verify it is within a preselected distance of the active signaling unit. When the active signaling unit calculates or determines that the passive signaling unit is no longer within the preselected distance, a signal is transmitted to activate the passive signaling unit, and both signaling units transmit their locations to the monitoring station. This allows the passive signaling unit to operate with less power and allows it to be smaller. In a further embodiment, a signaling unit can transmit its location and optionally a message on demand, for example, an emergency call for help.

In another embodiment, a method of using the security and tracking system comprises monitoring of a physiological function and transmitting a signal due to an emergency condition such as a complete lack of movement, loss of blood pressure, loss of pulse, a spike in blood pressure, or other monitorable physical conditions associated with an individual's health condition (i.e., diabetes, epilepsy and the like). This option is useful for high-risk infants, high-risk individuals, and individuals in danger.

EXAMPLE 5

An asset and personnel location tracking system utilizes GPS technology, cellular technology, and a low power RF transceiver. The asset or person wears multiple redundant signaling units that each transmits its location in the case of an emergency. Each of the worn signaling units supports inter-device communication, is able to use GPS to find its location, and is able to transmit its location via a cellular link. All signaling units worn by an asset or person communicate with each other using low power RF transceivers. This detects the removal of a signaling unit or device malfunction. A server records all the information transmitted by each signaling unit. Such information includes longitude, latitude, date/time stamp, and asset or personal identification (such as an id number). The server uses the asset/personal id number to match identity, historical and/or medical information with each asset or person. The server allows authorized access to a database for displaying the current location, log of last known locations, and other information regarding the asset or person. For example, the database may be powered by a MySQL database. The server-side scripting may be done by PHP. A web-based user interface may use valid Xhtml as defined by the Internet Standards (w3.org).

For purposes of illustration, but not limitation, the database may include two tables, one for client information, and one for updates from the signaling units. The two tables are linked through the client ID, a unique number assigned to each client. Examples of the table fields are listed below.

Client Information Table

Client ID.
Child's first name.
Child's last name.
First name of the child's guardian.
Last name of the child's guardian.
Home phone number of the guardian.
Child's Social Security Number.
Special medical considerations.
Phone Number to use in case of emergency.
Status of the client's account.
Location from the most recent update.
Number of minutes to wait between signaling unit updates.
Option to adjust the update interval of signaling unit device.
Any additional information that might be desired.

Update Table

Unique update ID given to every update.
Client ID signifies which client the update ID is for.
Percentage of power left in the signaling unit device.
Longitude of the device.
Latitude of the device.
Altitude of the device.
Status of the device.
Time the update occurred.

One personal signaling unit includes a micro-controller that will interface a cellular phone, a GPS receiver, and a low power RF transceiver. The micro-controller may, for example, be a PIC 18 series processor, supporting at least two UART devices and having a hardware timer to create a serial connection. Another microprocessor for the GPS enabled signaling unit is the Rajone Pty, Ltd. Genius IV chip. The cellular phone may be interfaced to the micro-controller through an RS-232 connection, and has an available SDK and supports two-way SMS. The GPS receiver may also be interfaced to the micro-controller by an RS-232 connection. Current commercial cellular phones having built-in GPS receivers, however, do not have a fully functioning SDK, two-way SMS, or sufficiently accurate GPS.

To perform the inter-device communication, a low power RF transceiver connects to the micro-controller via a serial connection, although options include Bluetooth™ and IEEE personal area network technology. The low power RF solutions use less power and are easy to interface.

Alternatively, the personal signaling unit may utilize a cellular embedded module. This provides substantially the same functionality as a cell phone, but includes the basic hardware similar to a cellular chipset (without an LCD, keypad, speaker, or microphone). According to another embodiment, both cellular and GPS requirements are integrated on a single chip.

There are three main components that comprise a cellular device: a receiver, a transmitter, and a modem. The receiver chipset is responsible for converting the radio frequency from the antenna to the frequency used by the modem. The transmitter chipset converts the frequency from the modem to a radio frequency that is to be sent over the air by the antenna. The modem (or mobile station modem) is used to initiate data connections, receive data connections, controls the receiver/transmitter chips, and various other functions.

Examples of cellular chipsets include Qualcomm™ IFR3000 and IFT3000 receiver transmitter chips that work in tandem with Qualcomm™ MSM chipsets for use in the CDMA cell network (PCS). The Motorola™ i250 platform is used for GSM cell phone communication.

Examples of GPS chips or modules include Valence Semiconductor's VS7001 chip, SiRF Technology's SiRFstarIIe/LP low power GPS chipset, and NAVMAN NZ Ltd.'s Jupiter GPS module.

In another embodiment, an individual wearing a subsystem signaling unit is notified when an associated second subsystem signaling unit is separated by more than a preselected distance. For example, a signaling unit in a wristwatch can generate a signal to the individual wearing the signaling unit if an associated subsystem signaling unit, for example in a cell phone or a PDA, is left behind, to prevent the individual from losing it.

While the present invention has been explained in relation to certain embodiments, it is to be understood that various modifications thereof will become apparent to those skilled in the art upon reading the specification. It should be understood that the embodiments described above may be practiced in the alternative, or in combination, as appropriate. Therefore, it is to be understood that the present invention is not limited to the specific embodiments described above, but includes variations, modifications defined by the following claims and equivalent embodiments. All such modifications and variations are intended to be included within the scope of the invention as defined in the appended claims.

We claim:

1. A security and tracking apparatus comprising at least a first signaling unit and a second signaling unit, wherein the second signaling unit is in communicating proximity with the first signaling unit, each respective said signaling unit having a receiver for identifying the location of said respective signaling unit; and, a transmitter for transmitting the location of said respective signaling unit when the first and second signaling units are separated by more than a preselected distance.

2. The security and tracking apparatus of claim 1, wherein said transmitter is automatically activated when the first and second signaling units are separated by more than the preselected distance.

3. The security and tracking apparatus of claim 1, including a receiver for receiving an initiating signal for activating the transmission of information identifying the location of the signaling units.

4. The security and tracking apparatus of claim 1, including a microcontroller for initiating the transmission of information identifying the location of the signaling units by at least one of the signaling units.

5. The security and tracking apparatus of claim 1, wherein at least one of the signaling units is adapted to be hidden.

6. The security and tracking apparatus of claim 1, wherein the receiver for identifying the location of the signaling units includes an antenna for communicating with the global positioning satellite (GPS) system or with low earth orbit satellites.

7. The security and tracking apparatus of claim 1, wherein the transmitter for identifying the location of the signaling units includes a transceiver for communicating with a cellular network.

8. The security and tracking apparatus of claim 1, wherein at least one of the signaling units is in a passive mode when said signaling units are in communicating proximity.

9. The security and tracking apparatus of claim 1, wherein at least one said signaling unit is small enough to be able to be hidden in a wearable article.

10. The security and tracking apparatus of claim 9, wherein at least one said signaling unit is incorporated into at least one of an article of clothing, a shoe, a watch, a wristband, a bracelet, an identification card, an article of jewelry, a hair accessory, eyeglasses, and an animal collar.

11. The security and tracking apparatus of claim 1, wherein at least one said signaling unit is incorporated into at least one of a molded article, an extruded article, and a sewn article.

12. The security and tracking apparatus of claim 1, wherein at least one signaling unit is incorporated into at least one of a credit card, a wallet, a checkbook, a purse, a cellular phone, a pager, a motor vehicle, a boat, an aircraft, a television, a radio, a stereo, a tape player, a compact disc player, a DVD player, an MP3 player, a VCR, a camera, a movie camera, a computer, a printer, a laptop or notebook computer, a PDA or PocketPC, a briefcase, a suitcase, a backpack, a weapon, an article of clothing, an article of jewelry, and an article of artwork.

13. The security and tracking apparatus of claim 1 wherein at least one said signaling unit is capable of secondary operations, optionally including at least one of receiving or transmitting video signals or audio signals, disabling a firearm, or disabling a motor vehicle.

14. A security and tracking system comprising
at least a first signaling unit and a second signaling unit, wherein the second signaling unit is in communicating proximity with the first signaling unit, each respective said signaling unit having a receiver for identifying the location of said respective signaling unit; and, a transmitter for transmitting the location of said respective signaling unit when the first and second signaling units are separated by more than a preselected distance; and
a monitoring station capable of receiving information identifying the location of said signaling units.

15. The security and tracking system of claim 14 wherein the monitoring station comprises a computer.

16. The security and tracking system of claim 14, wherein said monitoring station includes a transmitter for transmitting information identifying the location of the signaling units from the monitoring station to a remote receiver.

17. The security and tracking system of claim 16, wherein the transmitter is adapted for communication selected from the group consisting of at least one of radio, wireless, cellular, Internet, telephonic, television, or satellite.

18. The security and tracking system of claim 16, wherein the location of the remote receiver is one of a law enforcement agency facility, a law enforcement vehicle, an emergency response vehicle, and an emergency care facility.

19. The security and tracking system of claim 14 wherein the monitoring station comprises a cellular phone, a PDA or PocketPC, a computer, or a combination thereof.

20. The security and tracking system of claim 14, wherein the receiver for identifying the location of the signaling units includes an antenna for communicating with the global positioning satellite (GPS) system.

21. The security and tracking system of claim 14, wherein the transmitter for identifying the location of the signaling units includes a transceiver for communicating with a cellular network.

22. A method to locate a person, animal, or object, comprising:
(a) providing in contact with or at least in close proximity to the person, the animal, or the object, at least a first signaling unit and a second signaling unit, wherein said second signaling unit is in communicating proximity with said first signaling unit, each said respective signaling unit having a receiver for identifying the location of said respective signaling unit and a transmitter for transmitting the location of said respective signaling unit when the first and second signaling units are separated more than a preselected distance; and
(b) activating the signaling units to transmit the location of the signaling units.

23. The method of claim 22, including automatically activating the transmission of the location of the signaling units when said signaling units are separated by more than the preselected distance.

24. The method of claim 22, including initiating the transmission of information identifying the location of the signaling units upon receiving instructions from a remote source.

25. The method of claim 22, including signaling the units from a monitoring station to initiate the transmission of information identifying the location of the signaling units.

26. The method of claim 22, including activating at least one of the signaling units to initiate the transmission of information identifying the location of the signaling unit.

27. The method of claim 22, including receiving the location of the signaling units from the global positioning satellite (GPS) system.

28. The method of claim 22, including operating at least one of the signaling units in a passive mode when said signaling units are in communicating proximity.

29. The method of claim 22, including continuously transmitting the information identifying the location of at least one of the signaling units.

30. The method of claim 22, including intermittently transmitting the information identifying the location of at least one of the signaling units.

31. The method of claim 22, including transmitting in an encrypted form the information identifying the location of the signaling units.

32. The method of claim 22, including transmitting the information identifying the location of the signaling units to a monitoring station.

33. The method of claim 32, including transmitting the information identifying the location of the signaling units from the monitoring station to a remote receiver.

34. The method of claim 33, including transmitting additional information from the monitoring station to a remote receiver.

35. The method of claim 34, including transmitting the description of the person, the animal, or the object from the monitoring station to a remote receiver.

36. The method of claim 33, including transmitting the information identifying the location of the signaling units from the monitoring station to a remote receiver using communication selected from the group consisting of radio, the internet, a telephone network, a cellular network, television, and satellite.

37. The method of claim 22, wherein at least one signaling unit is small, and wherein providing said signaling unit includes hiding said small unit in a wearable article.

38. A method of locating a person, animal or object comprising:
a) providing an apparatus adapted to be in contact or at least in close proximity to the person, the animal or the object, the apparatus comprising at least a first signaling unit and a second signaling unit, wherein the second signaling unit is in communicating proximity with the first signaling unit, each said respective signaling unit having a receiver for identifying the location of said respective signaling unit; and, a transmitter for transmitting the location of said respective signaling unit when the first and second signaling units are separated by more than a preselected distance;

b) communicating between each said respective signaling unit to determine whether said signaling units are separated by more than the preselected distance; and c) upon determining that said signaling units are separated by more than the preselected distance, transmitting the location of the signaling units to a monitoring station, optionally activating said signaling unit that may be in a passive mode to transmit its location to the monitoring station.

39. The method of claim 38 including transmitting the location of the signaling units, and optionally, additional information, to a remote receiver.

40. The method of claim 38 including communicating between each signaling unit at least periodically.

41. The method of claim 38 including communicating between each signaling unit continuously.

42. The method of claim 38 including communicating between each signaling unit upon demand from the monitoring station.

43. The method of claim 38 including transmitting the location of the signaling units upon demand from the person.

44. The method of claim 38 including logging the location of the signaling units in a database associated with the identification and optionally other information associated with the person, the animal or the object.

45. The method of claim 38 including identifying the location of said respective signaling unit using a GPS receiver.

46. The method of claim 38 including transmitting the location of said signaling units using a cellular transceiver.

47. The method of claim 38 including monitoring a physical function for transmitting a signal associated with an emergency condition.

48. The method of claim 38 including transmitting the location of said signaling unit to respective the monitoring station upon loss of communication with the other signaling unit.

49. A method of locating a person, animal or object comprising:

a) providing an apparatus adapted to be in contact or at least in close proximity to the person, the animal or the object, the apparatus comprising at least a first signaling unit and a second signaling unit, wherein the second signaling unit in proximity with the first signaling unit, each respective said signaling unit having a receiver for identifying the location of said respective signaling unit; and, a transmitter for transmitting respective the location of said signaling unit;

b) transmitting the location of each of the signaling units to a monitoring station;

c) calculating whether said signaling units are separated by more than a preselected distance; and d) upon calculating that said signaling units are separated by more than the preselected distance, initiating at least frequent or continuous transmission of location from each of said signaling units, optionally activating said signaling unit that may be in a passive mode to transmit its location to the monitoring station.

50. The method of claim 49 including transmitting the location of the signaling units, and optionally, additional information, to a remote receiver.

51. The method of claim 49 including transmitting the location of each of the signaling units to the monitoring station upon demand from the monitoring station.

52. The method of claim 49 including transmitting the location of the signaling units upon demand from the person.

53. The method of claim 49 including transmitting the location of at least one said signaling unit to the monitoring station upon demand from the monitoring station upon loss of transmission from the other signaling unit.

54. The method of claim 49 including logging the location of the signaling units in a database associated with the identification and optionally other information associated with the person, the animal or the object.

55. The method of claim 49 including identifying the location of said signaling units using a GPS receiver.

56. The method of claim 49 including transmitting the location of said signaling units using a cellular transceiver.

57. The method of claim 49 including monitoring a physical function for transmitting a signal associated with an emergency condition.

58. The method of claim 49 wherein said calculating is processed by at least one said signaling unit.

59. The method of claim 49 wherein said calculating is processed by the monitoring station.

60. A security and tracking apparatus for a person, an animal or an object comprising at least a first signaling unit and a second signaling unit adapted to be hidden in contact or in close proximity to the person, the animal or the object, wherein the second signaling unit is in communicating proximity with the first signaling unit, each respective said signaling unit having a GPS receiver for identifying the location of said respective signaling unit; and, a cellular transceiver for transmitting the location of said respective signaling unit when the first and second signaling units are separated by more than a preselected distance.

61. The security and tracking apparatus of claim 60 wherein each respective said signaling unit is adapted to activate its cellular transceiver to transmit the location of said respective signaling unit to a monitoring station under at least one of the following conditions:

a) automatically when the first and second signaling units are separated by more than a preselected distance, b) upon demand from the monitoring station, c) upon demand from the person, d) upon loss or absence of communication from the other signaling unit, or e) upon preselected intervals;

wherein the monitoring station optionally comprises a cellular phone, a PDA or PocketPC, a computer, or a combination thereof.

62. The security and tracking apparatus of claim 60, wherein each respective said signaling unit has a low power RF transceiver for communication with the other signaling unit.

63. The security and tracking apparatus of claim 60, wherein at least one said signaling unit is incorporated into at least one of an article of clothing, a shoe, a watch, a wristband, a bracelet, an identification card, an article of jewelry, a hair accessory, eyeglasses, and an animal collar.

64. The security and tracking apparatus of claim 60, wherein at least one signaling unit is incorporated into at least one of a credit card, a wallet, a checkbook, a purse, a cellular phone, a pager, a motor vehicle, a boat, an aircraft, a television, a radio, a stereo, a tape player, a compact disc player, a DVD player, an MP3 player, a VCR, a camera, a movie camera, a computer, a printer, a laptop or notebook computer, a PDA or PocketPC, a briefcase, a suitcase, a backpack, a weapon, an article of clothing, an article of jewelry, and an article of artwork.

65. The security and tracking apparatus of claim 60, wherein at least one signaling unit is incorporated into a watch.

66. The security and tracking apparatus of claim 60, wherein at least one signaling unit is incorporated into a cellular phone.

67. The security and tracking apparatus of claim 60, wherein at least one signaling unit is incorporated into a pager.

68. The security and tracking apparatus of claim 60, wherein at least one signaling unit additionally comprises a monitoring station adapted to generate a signal to notify the person of the other signaling unit being separated by more than a preselected distance.

69. The security and tracking apparatus of claim 60, wherein at least one signaling unit additionally is adapted to monitor and report at least one physical condition of the person.

70. The security and tracking apparatus of claim 60, wherein said signaling units are powered by a power source selected from the group consisting of rechargeable battery, replaceable battery, solar cell, kinetic power device, or combinations thereof.

* * * * *